United States Patent [19]

Örnberg

[11] 4,257,308
[45] Mar. 24, 1981

[54] ANCHORING DEVICE FOR AN OPENING, E.G. A TUBE END

[76] Inventor: Stellan Örnberg, Klintvägen 3, 522 59 Jönköping, Sweden

[21] Appl. No.: 2,589

[22] Filed: Jan. 11, 1979

[30] Foreign Application Priority Data

Oct. 20, 1978 [SE] Sweden ................................ 7800732

[51] Int. Cl.³ .................... F16B 13/04; A47B 91/06; B60B 33/00
[52] U.S. Cl. .................................... 411/354; 16/42 T; 403/260; 411/75; 411/366; 411/538
[58] Field of Search .................... 85/67, 69, 73, 74, 75, 85/79, 50 C; 16/38, 42 T, 30, 43; 403/258, 260, 297; 151/20; 405/259; 248/188.8

[56] References Cited

U.S. PATENT DOCUMENTS

| 737,555 | 8/1903 | Dorn | 16/38 X |
|---|---|---|---|
| 1,037,277 | 9/1912 | Martin | 85/79 |
| 1,276,708 | 8/1918 | Bair | 85/75 |
| 1,964,427 | 6/1934 | Chandler | 85/79 |
| 2,051,251 | 8/1936 | Epstein | 85/79 X |
| 2,706,499 | 4/1955 | Grable | 85/79 X |
| 2,918,840 | 12/1959 | Roesler | 85/69 |
| 2,931,626 | 5/1960 | Beach et al. | 16/38 |
| 3,192,822 | 7/1965 | Genter | 85/79 |
| 3,438,300 | 4/1969 | Blum et al. | 85/50 C |
| 4,073,329 | 2/1978 | Hala | 85/50 C |

FOREIGN PATENT DOCUMENTS

| 303426 | 1/1918 | Fed. Rep. of Germany | 405/259 |
|---|---|---|---|
| 919286 | 8/1954 | Fed. Rep. of Germany | 405/259 |
| 1191943 | 4/1965 | Fed. Rep. of Germany | 16/38 |
| 645249 | 9/1962 | Italy | 403/297 |
| 159904 | 4/1933 | Switzerland | 85/79 |
| 546984 | 8/1942 | United Kingdom | 85/79 |

*Primary Examiner*—Thomas J. Holko
*Attorney, Agent, or Firm*—Blanchard, Flynn, Thiel, Boutell & Tanis

[57] ABSTRACT

The invention concerns an anchoring device, more particularly a screw anchoring device, for insertion in an opening, e.g. in the end of a tube, to there form an anchor for a screw or bolt introduced into the opening. The device comprises an internally threaded locking body, preferably a conventional hexagonal nut, and a sleeve which is shaped, at least at one end thereof, to provide a tip portion, e.g. by being cut off obliquely. The device is inserted into the opening with the screw engaging the locking body and loosely accommodating the sleeve, whose tip portion is facing the body. In tightening the screw the locking body becomes wedged between the tip portion of the sleeve and an opposing portion of the wall of the opening. The union body-sleeve will then form a solidly fixed anchor for the screw, which itself can be loosened and tightened as desired.

9 Claims, 7 Drawing Figures

U.S. Patent  Mar. 24, 1981  4,257,308
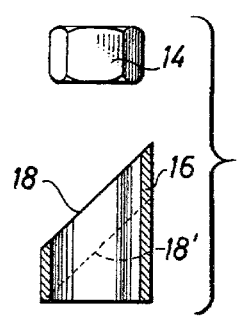
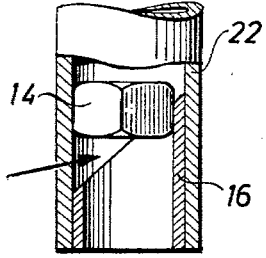
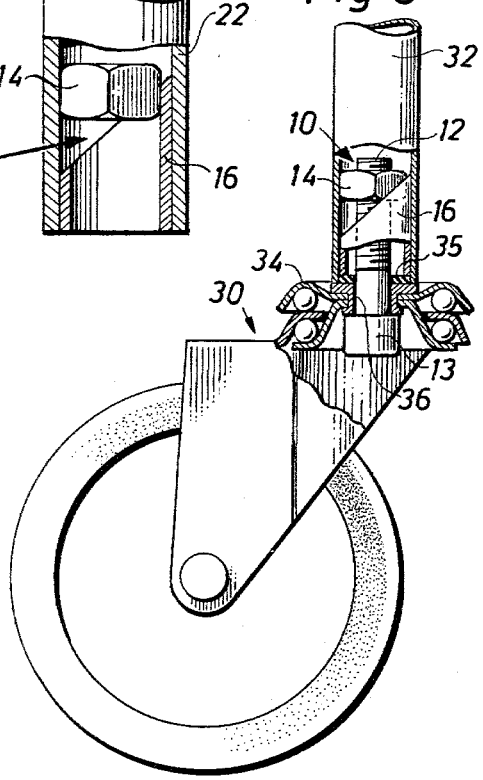
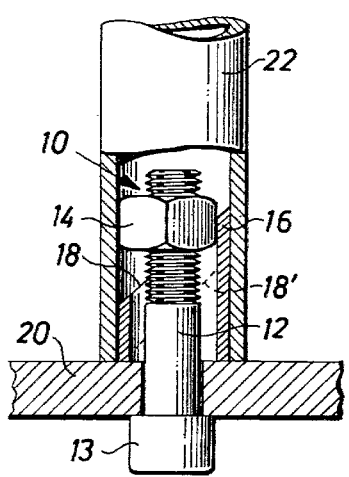
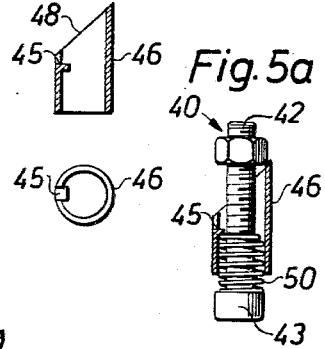
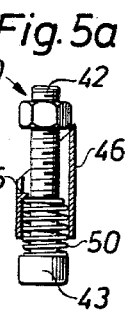
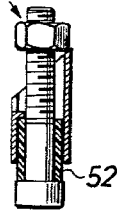

ANCHORING DEVICE FOR AN OPENING, E.G. A TUBE END

The present invention generally relates to anchoring devices of the kind in which a screw or bolt can be caused to be fixed in an opening, e.g. a tube end, an aperture in a wall, etc. by an internally threaded locking body inserted in the opening.

A number of different variants of such devices are known. One usual variant consists of a sleeve provided with slits, intended for insertion in the opening in question. The sleeve embraces a movable tapering locking body provided with an internal thread for an attaching bolt. The sleeve together with the locking body and bolt are inserted in the opening, and when the bolt is turned it pulls on the locking body, causing the surrounding sleeve to expand and thus wedge solid against the walls of the opening. The locking body is thereby locked to form an anchorage for the bolt.

When it is desired to make a screw anchorage inside a tube, close to an open end thereof, so that threaded fastening means can be screwed into and secured by the anchorage in the tube, it is not common practice to use an expanding variant as described above for insertion in the tube. It is more often cheapest and simplest to weld or press an internally threaded locking plug or washer into the tube end for mating with threaded fastening means. This variant of anchoring device is commonly used in tubular steel furniture, where there are often tube ends into which screws or bolts must be secured for attachment purposes. For example, tubular steel tables or chairs are often provided with castors, each castor generally being secured by means of a screw inserted in a threaded locking plug or washer welded into the end of its leg.

An object of the invention is to provide an anchoring device of the kind in question, which is generally utilizable for anchoring a threaded locking body in an opening, into which a bolt or screw can be screwed.

A further object of the invention to provide such a device, which is particularly simple and cheap to manufacture so that it can with advantage replace the above-mentioned common arrangement of a threaded locking plug or washer welded into a tube end.

According to the invention, an anchoring device of the kind in which a screw or bolt can be caused to be fixed in an opening by an internally threaded locking body inserted in the opening, is characterised by a sleeve which is shaped at one end to provide a tip portion, said sleeve being intended to located within the opening between the locking body and screw or bolt with its tip portion facing towards said body, and by said body being arranged to be engaged by said tip portion of the sleeve such that said body is securely wedged between said tip portion and an opposing portion of the wall of the opening by tightening of the screw or bolt to cause said body to be drawn towards the mouth of the opening.

In order that the invention may be readily understood, it will now be described in detail with reference to the accompanying drawings, in which:

FIG. 1 shows one embodiment of the anchoring device, together with a screw, in an exploded, part-sectional view, FIG. 2 shows in part-section, the embodiment according to FIG. 1 in an assembled state, inserted in a tube end and fixing a plate by means of the screw, FIG. 2a shows in part-section only the anchorage device elements, FIG. 3 shows the anchoring device used to fix a castor to the end of a leg of tubular steel furniture, FIG. 4 shows a modified type of sleeve element for the anchoring device, and, FIGS. 5a and 5b show examples of how the sleeve of FIG. 4 can be combined with the other elements of the anchoring device, Referring to FIG. 1, a conventional screw or bolt 12 is shown, together with an anchoring device 10 in accordance with the invention. The anchoring device 10 consists of two parts, the first one being a locking body having an internally threaded bore, in this embodiment a conventional hexagonal nut 14, the second part being a sleeve 16 with one oblique end, so that the sleeve is given an end surface 18 forming an acute angle, preferably of the order of 45°, to the sleeve axis, the acute angle providing a tip portion.

Referring now to FIG. 2, it is assumed that a plate 20 is to be tightened down and fixed against the end of a tube 22. As mentioned hereinbefore, the conventional arrangement is to weld an internally threaded plug or washer into the tube end, the plate 20 subsequently being tightened down against the tube end by means of a suitable fastening screw. By using the anchoring device 10, this arrangement is considerably simplified. Thus, a screw 12 is inserted through a hole in the plate 20 and, as shown in FIG. 2, the assembly consisting of a screw, nut 14 and sleeve 16 is inserted into the tube end, and the screw rotated in the tightening direction. This causes the nut 14 to tilt somewhat in the tube end, whilst it is prevented from accompanying the rotation of the screw by a corner portion of one of its flats engaging against the tip portion of the oblique end surface 18 of the sleeve 16. When rotation of the screw is continued, the nut 14 will thus be drawn down the oblique face and forced outwardly to become wedged between the sleeve and the opposing inner surface of the tube wall, as is clearly apparent from FIG. 2. Thus, a solid, wedged union with the tube is formed which is extremely stable, and the screw 12 can be removed if so desired, leaving the nut 14 and sleeve 16 in the tube end 22, see FIG. 2a, where they remain solidly wedged to form the anchoring device 10, fully equivalent to a plug or washer normally welded into the tube end, but created in a considerably simpler manner since, for example, no welding is required.

Together with a suitable screw 12, the anchoring device can be stocked as an easily handled unit, the sleeve 16 being placed on the shank of the screw 12 between its head and the nut 14.

The anchoring device 10 can be further simplified by making the other tube end oblique, i.e. by a second parting cut during manufacture parallel to the end 18, as denoted by a dashed line 18' in FIGS. 1 and 2. The function of the sleeve will be exactly the same as described above, but this sleeve will save on material and be simpler to manufacture, since a number of sleeves can be readily made from a single tube by parting-off at spaced positions using parallel cuts.

FIG. 3 shows the anchoring device 10 used to attach a castor 30 to the end of a tubular leg 32 of a chair. The castor 30 is made conventionally and has a bearing unit 34, comprising concentric bearing plates with a through hole 36. The unit 34 corresponds to the plate 20 in FIG. 2, and a screw 12 is inserted through the hole 36. The assembly for attaching to the leg thus consists of castor 30, screw 12, sleeve 16 and nut 14, and in the manner described above, that part consisting of screw, sleeve and nut is inserted in the end of the leg 32. After tightening up the screw 12, the castor 30 will be firmly attached to the leg 32, without the need for a welded plug or the like.

An anchoring device according to the invention has been found to give very good savings, especially in furniture manufacture.

With regard to centering the nut of the anchor 10 in the bore, it is pointed out that although the nut cannot be located exactly centrally in the bore due to the wedging principle, the eccentricity is shown exaggerated in the Figures to illustrate clearly the inventive idea. In practice, centering can be very good, e.g. when the anchoring device is to be inserted in a tube end as shown in FIG. 3. Thus, if the inside diameter of the tube 32 is so selected in relation to the distance across the corners of the nut 14 so that the nut is a light sliding fit in the tube, it will be fairly well centered in the tube after being wedged. The slight eccentricity which occurs will have no practical significance, especially taking into account the fact that the nut will be spaced a good distance along in the tube.

In the above description and in the Figures, the sleeve 16 incorporated in the anchor is shown as a tubular element produced, for example, by parting tubular material. However, the sleeve can also be made from sheet material, e.g. by stamping or rolling (when the sleeve is given a more or less wide longitudinal slit or slot). In some cases the use of moulded plastics material can be envisaged. As should be apparent from the preceding, what is essential is that the sleeve at least at one end is extended or drawn out to a tip portion.

Referring to FIG. 2 it will be seen that the outer end of the sleeve 16, i.e. that nearest the head 13 of the screw 12, will engage against the member (plate 20) to be attached. Thus, it is possible that said member is pressed against said sleeve end when tightened down, instead of against the tube end. To avoid this the sleeve together with the nut can be wedged in place a little farther within the tube to ensure that said member to be fastened is in direct engagement with the tube end. This can be accomplished by simple measures as follows:

In the case illustrated in FIG. 3, where it can be assumed that the sleeve 16 will be displaced during tightening a small distance before it is definitely wedged and fixed, an elastic washer 35 of rubber or plastics can be inserted between the sleeve 16 and the outer member, i.e. the ball bearing plate 34 of the castor 30. The small displacement of the sleeve before being wedged is taken up by the washer and the castor will thus be tightened down directly onto the end of the leg 32. A stiff washer can also be used, although this is suitably removed after the anchoring device 10 has been wedged in place.

In cases where a certain amount of displacement must be reckoned with for the sleeve, before it is fixedly wedged, e.g. in a hole in a concrete wall, the anchoring device 10 can be modified as shown in FIGS. 4 and 5, in which a sleeve 46 is generally the same as the sleeve 16, but is provided with a small inwardly folded flap or lug 45. As can be seen, this lug is bent in from the oblique end 48 of the sleeve 46, at a point diametrically opposite to the tip portion of said end. Together with a nut 44, the sleeve 46 forms an anchoring device 40 and is assembled as previously with a suitable screw 42 to provide an assembly which includes a small spring 50 (see FIG. 5a) the spring being placed between the inwardly projecting lug 45 and the head 43 of the screw. When the assembly is fitted into its hole for anchoring an outer member, the spring will abut this member to ensure that the sleeve 46 is constantly spaced from the member and thereby from the mouth of the hole. The outer end of the sleeve 46 will thus be located fully inside the mouth of the hole after being wedged, to ensure that the member is tightened down directly against the material surrounding the hole.

An anchoring device 40' is shown in FIG. 5b, which is the same as the device 40 in FIG. 5a, except that the spring 50 is replaced with a light plastics sleeve 52 or the like. The plastics sleeve 52 serves exactly the same purpose as the spring 50 in FIG. 5a, namely keeping the sleeve 46 away from the mouth of the hole in which it is fitted, displacement of the sleeve 46 being accommodated by deformation of the plastics sleeve 52.

It will be appreciated that further modifications are possible within the scope of the following claims. The nuts in the embodiments described above are standard, and represent the cheapest components which can be used. However, specially formed nut means utilising the described wedging principle can be used for particular purposes.

I claim:

1. A radially expansible anchoring device of the kind including a screw or bolt and an internally threaded locking body insertable in a walled opening for fixing the screw or bolt in such opening, wherein the improvement comprises a tubular sleeve receivable in the opening, said locking body having an end suface substantially perpendicular to its longitudinal axis and facing said sleeve, said sleeve having an end surface facing said locking body substantially perpendicular end surface and inclined with respect thereto, said substantially perpendicular end surface of said locking body engaging at one edge thereof against said inclined end surface of said sleeve, such that said locking body is securely wedged between a portion of said inclined end surface of said sleeve and an opposing portion of the wall of the opening by tightening of the screw or bolt to cause the body to be drawn toward the mouth of said opening.

2. An anchoring device as claimed in claim 1, in which said locking body is a hexagonal nut.

3. An anchoring device as claimed in claim 1, wherein the inclined end surface of the sleeve is defined by a plane forming an acute angle to the axis of said sleeve, said substantially perpendicular end surface of said locking body being defined by a plane, said acute angle is about 45°.

4. An anchoring device as claimed in claim 1, wherein, and said locking body has a multisided periphery with corners engageable with the wall of said opening at a location opposite the inclined end surface of said sleeve.

5. An anchoring device of the kind including a screw or bolt and an internally threaded locking body insertable in an opening for fixing the screw or bolt in such opening, wherein the improvement comprises a sleeve receivable in the opening, said locking body having a transverse end surface facing said sleeve, said sleeve having an end surface facing said locking body transverse end surface and inclined with respect thereto, said transverse end surface of said locking body engaging at one edge thereof against said inclined end surface of said sleeve, a yielding member at least partially telescoped within said sleeve, the sleeve having an internal lug backing said yielding number so as to retain the sleeve in a position fully within the opening during tightening with the screw or bolt, such that said locking body is securely wedged between a portion of said inclined end surface of said sleeve and an opposing portion of the wall of the opening by tightening of the screw or bolt to cause the body to be drawn toward the mouth of said opening.

6. An anchoring device as claimed in claim 5, wherein said yielding member comprises a helical compression spring.

7. An anchoring device as claimed in claim 5, wherein the yielding member comprises a further sleeve made from plastics or the like material.

8. In combination, a first member having a walled opening therein, a second member to be secured to said first member at said walled opening, and a radially expansible anchor device to be fixed in said walled opening to effect such securement, said radially expansible anchoring device having an elongate threaded shank supporting radially enlarged first and second heads adjacent opposite ends thereof, said first head being internally threaded and threadedly adjustable on said shank to vary the distance between said heads, said shank and one of said heads being received and fixed in said walled opening in said first member while the other said head is secured to said second member, said anchoring device further having a tubular sleeve carried on said shank between and in engagement with said one head and second member within said opening, said tubular sleeve having an inclined end surface facing said one head, said one head having a noncircular periphery and having a noninclined end surface facing said inclined end surface of said tubular sleeve with an edge portion of said noninclined end surface engaged with said inclined end of said sleeve, the opposite peripheral surfaces of said tubular sleeve and said one head being wedged apart and forced against the interior wall of said opening with said first head threadedly tightened on said shank.

9. A three-part radially expansible anchoring device engageable in a walled opening of a first member for fixing a second member against said first member, said expansible anchoring device including (1) a bolt member having one end insertable in said opening in the first member and the other end securable to the second member, and (2) an internally threaded locking body of noncircular peripheral shape threaded on one end of said bolt member and insertable in said walled opening for fixing said one end of the bolt member in such opening and (3) a single length of tubing loosely telescoped over said bolt member inboard of said locking body and therewith receivable in the opening, said radially expansible anchoring device having two substantially diametrally oppositely facing wall engaging surfaces which are forceable radially outward away from each other to grip the wall of said opening in said first member, one said wall engaging surface being on said length of tubing and the other on the noncircular periphery of the locking body, said locking body having a substantially planar end surface substantially perpendicular to its axis and facing said length of tubing, said length of tubing having a substantially planar end surface facing said locking body end surface and inclined at about 45° with respect thereto, said locking body engaging at one edge thereof against said inclined end surface of said length of tubing in minimum area contact therewith for securely wedging said locking body between a portion of said inclined end surface of said length of tubing and an opposing portion of the wall of the opening by tightening of the bolt member to cause the body to be drawn toward the mouth of said opening.

* * * * *